United States Patent [19]

Machovina

[11] Patent Number: 4,748,761

[45] Date of Patent: Jun. 7, 1988

[54] FISHING FLOAT

[76] Inventor: William J. Machovina, 15946 Kingswood Ct., Strongsville, Ohio 44136

[21] Appl. No.: 54,721

[22] Filed: May 27, 1987

[51] Int. Cl.⁴ .............................................. A01K 93/00
[52] U.S. Cl. ........................................ 43/17; 43/17.5
[58] Field of Search ...................... 43/17.5, 17, 44.87

[56] References Cited

U.S. PATENT DOCUMENTS

| | | | |
|---|---|---|---|
| 1,541,724 | 6/1925 | McElree | 43/17 |
| 2,448,681 | 9/1948 | Nutter | 43/17 |
| 2,542,132 | 2/1951 | Goertzen | 43/17 |
| 2,988,840 | 6/1961 | Seigle | 43/17.5 |
| 4,157,627 | 6/1979 | Tschelisnik | 43/17.5 |
| 4,486,969 | 12/1984 | Swenson | 43/17 |

FOREIGN PATENT DOCUMENTS

| | | | |
|---|---|---|---|
| 1296452 | 5/1969 | Fed. Rep. of Germany | 43/17 |
| 640967 | 6/1962 | Italy | 43/17 |

Primary Examiner—Gene P. Crosby
Attorney, Agent, or Firm—Donald A. Bergquist

[57] ABSTRACT

This invention relates to fishing floats and more particularly to a lightweight illuminated tip-up fishing float for use while fishing at night, which float contains no toxic mercury to contaminate the fishing waters should the float become lost and broken or broken during use, and which float features a cageable, automatically decageable, dead-weight switch to control the lighting thereof when there occurs a fish bite or strike on the line to which the float is secured.

17 Claims, 1 Drawing Sheet

FISHING FLOAT

INTRODUCTION

The present invention relates to fishing floats and more particularly to a lightweight illuminated tip-up fishing float for use while fishing at night, which float contains no toxic mercury to contaminate the fishing waters should the float become lost and broken or broken during use, and which float features a cageable, automatically decageable, dead-weight switch to control the lighting thereof when there occurs a fish bite or strike on the line to which the float is secured.

DESCRIPTION OF THE PRIOR ART

A number of previous inventors have presented fishing floats that include a battery connected in series with a light bulb and a switch that closes upon the tug of a fish on the line to which the float is secured. Many of their inventions rely upon a mercury switch to complete the circuit when the orientation of the tip-up float is changed by the tug of the fish on the line.

Concerns of mercury pollution of fishing waters make the use of floats that include mercury switches unconscionable. It is not uncommon for a fishing float to become detached from the line or otherwise lost in the fishing waters. Once lost, the natural action of waves or corrosion, the curiosity of wildlife, or actions of man interacting with the environment in a myriad of ways may cause the lost float and the sealed mercury switch within it to be broken open, thereby exposing the fishing waters to the toxic mercury. Elemental mercury thus released is not readily dissipated; it remains in the environment for an extremely long time, dissolving only slowly to contaminate the food chain over a period of years or tens of years, depending upon the flow through the body of water contaminated. The mercury from one lost float may not present a serious problem; a hundred or a thousand in the same body of water however, may constitute a significant hazzard to fish, to wildlife, and even to man.

Mercury switches have been used in the following U.S. patents on various fishing floats: U.S. Pat. Nos. 4,486,969/P. S. Swenson; 2,464,309/V. R. Harshman; 2,280,457/H. M. Sutcliffe; 2,205,352/F. H. Fisher; and 2,001,109/C. J. Petrie.

With regard to the Swenson patent, although its example includes a mercury switch, its claims describe more generically a signaling float comprising an electrical circuit means "including a position-sensitive switch" sealed within a hollow body member in combination with a ballast means that keeps the body member floating "in a normal upright position in the water" and fish line attaching means offset from and on each side of the vertical axis of the float "so that said body member pivots about a center of gravity from said upright position in response to the strike of a fish to close said position-sensitive switch and energize said signal device." The present invention will be shown to differ from that of Swenson in that: the position sensitive switch of the present invention requires no ballast to maintain its body member to stay in a specified "normal upright position" indeed, it has no "normal upright position", being free to rotate about its longest axis while floating with that axis substantially horizontal; its switch element may be "caged" or disconnected while the float is not in use, said caging being automatically removed by the forces incident to the first casting of the float onto the water; and connection to the fish line is at one point only.

In a similar manner, the Harshman patent describes in its example the use of a mercury switch but in its claims uses the generic "means responsive to the angular position of said body for controlling said illuminating means" to describe the switch. No means is provided by Harshman for caging or holding open the circuit for the current path for storage, as is taught by the present invention.

The Sutcliffe patent specifically includes the mercury switch in the claims thereof and does teach a manually operated switch for opening the circuit for storage during periods of non-use, which switch must be manually operated to resume the functioning of the signal circuitry. In contrast to Sutcliffe, the present invention includes automatic removal of the caging by the forces incident to the first casting of the float onto the water. No similar feature has been seen in any prior art uncovered in searching U.S. Patent Class/Subclass 43/17.

Mechanical signal-activating switches have been used in a number of other U.S. patents in the noted subclassification; the patents found are: U.S. Pat. Nos. 3,739,513/G. M. Durham; 3,608,227/R. H. Adams; 2,988,840/W. Seigle; 2,947,105/T. L. Lagios; 2,252,358/J. Tosi; 2,224,471/G. A. Burgin; 2,128,899/W. S. Barnhart; 1,972,724/H. V. White; 989,145/A. Hatchett. None of the mechanical switches described in these patents are cageable and none are dead-weight switches of the type taught in the present application.

The first difference to be noted between these inventions and the present invention is that the signal-actuating switch means in most of the above-listed patents are not position-sensitive switches, rather they require spring means against which the tug on the fish line must act to complete the electrical circuit. The three exceptions to this statement are Lagios, Tosi and Barnhart.

Lagios uses a movable weight or body member that moves the lamp against the biasing force of a spring that is the contact for a first terminal of the lamp, said motion causing the second terminal of the lamp to make contact with the battery to light the lamp. The light from the lamp is visible through the transparent housing used in the float. No caging or manual switch is mentioned by Lagios.

Tosi has the lamp freely movable in a socket under the action of gravity such that when the float is tilted upright from its normal horizontal position, the lamp will make contact with both electrical contacts to light the lamp. In effect, the lamp or light bulb is its own dead weight acting in a dead weight switch close the circuit. Applicant finds this method to be unreliable in creating a sure-fire switch for the intended use due to oxidation of the contacts and a resulting high electrical contact resistance. Most switches designed for low voltage operation, especially in direct current circuits have contacts that slide upon one another to mechanically break through the high-resistance oxide layer; Tosi appears to ignore this problem. Tosi also presents no provision for caging his switch.

Barnhart teaches a position-sensitive switch that includes a non-conductive weight that falls upon a lever that makes the electrical contact to light the lamp. Barnhart does not provide for storage of the float with the electrical circuit inactive; in fact, the device taught would likely light the lamp continuously if it were placed on a flat surface for storage.

DETAILED DESCRIPTION OF THE INVENTION

This invention will be best understood by referring to the attached drawings wherein like reference numbers identify the same part throughout the figures.

Figure 1:
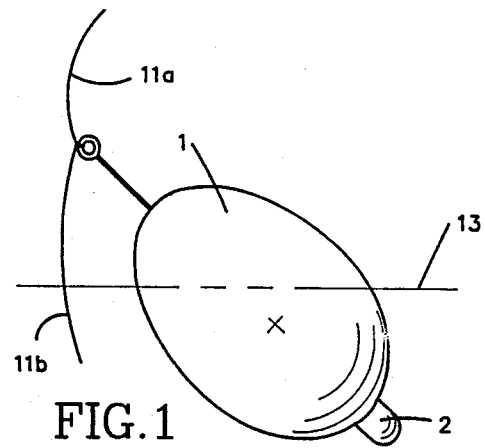
FIG. 1 shows a perspective view of the fishing float of the present invention floating on the surface of a body of water in the non-bite state.

FIG. 1 shows the fishing float of the present invention floating on the surface of a body of water 13 while connected to a fishing line one portion 11a of which is shown to be relatively slack and the second portion of which 11b is shown to be relatively taut, the latter portion supporting the weight of the lure, leader, hook or hooks, and any fishing weights that may be attached to such tackle, but not sufficient weight to tip the float from its relatively stable floating orientation.

Figure 2:
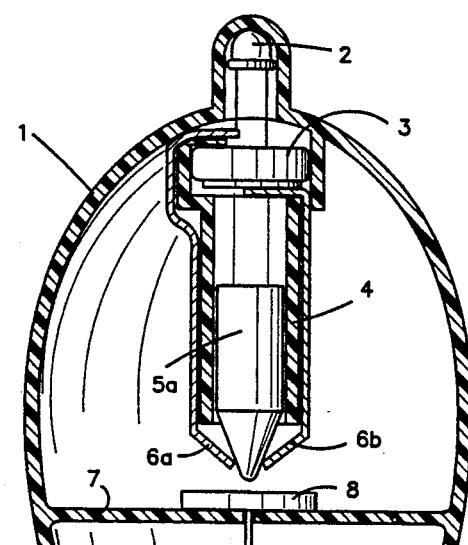
FIG. 2 shows a cutaway view through the center of the invention along the long axis thereof.

As can be seen in FIG. 2, the float comprises a hollow body 1 forming a watertight compartment that contains a lamp 2, a battery power source 3, and a dead-weight switch 4, all of which are elements in a series electrical circuit so that bridging by a conductive weight 5a of the switch contacts 6a and 6b results in illuminating the lamp 2 by using electrical power from the battery power source 3. A means 8 for caging the dead weight switch 4 by physically preventing the conductive weight 5a from contacting one or both switch contacts 6a and 6b is a unique feature of the invention.

The lamp 2 is shown as being positioned in an extension of the body housing, which in this mode must be transluscent or transparent to allow light from the lamp to be seen from outside of the body. Alternatively, the lamp could actually protrude through a hole in the wall of the body with the hole being sealed with a waterproof sealant.

In all cases in this specification and in the claims attached hereto, when we speak of a lamp in the context of the present invention, we mean to include any integrated electrical or electronic device that reproducibly and reliably produces light when an appropriate voltage is applied to appropriate terminals thereof. Thus, light bulbs or light emitting diodes are included, as are integrated circuits that are capable of emitting light; bare filaments or fuses are not included if they burn out upon the application of a voltage. The specific examples in the figures associated with this application show a light emitting diode, but applicant has also used light bulbs and blinking diodes with equal success.

Figure 3:
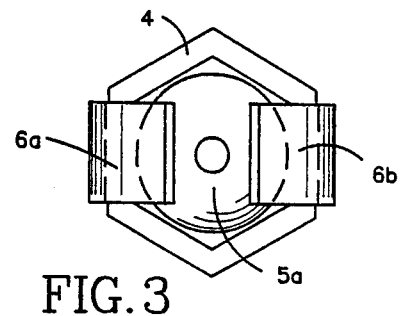
FIG. 3 shows an end-on view of the switch to show details of the position sensitive switch.

FIG. 3 shows details of the switch 4 with weight 5 and contacts 6a and 6b, showing the relative position of the parts and showing that the weight will easily bridge the gap between the contacts. The housing 4 for the weight 5 is shown to be hexagonal in cross section; this is an especially convenient shape, but other shapes are certainly suitable.

Figure 4:
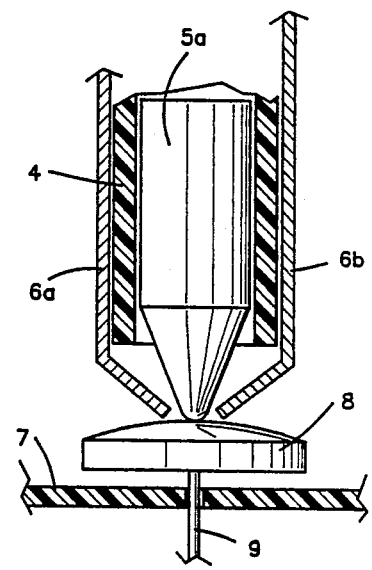
FIG. 4 shows additonal detail of the position sensitive switch and the caging device.

Especially important in this invention is the caging device 8 for the switch element 4, the operation of which is made evident in FIG. 4. When the caging element 8, which is a flat or convex surfaced non-conductor, is raised, it quite effectively prevents the weight 5 from simultaneously touching contacts 6a and 6b, thus keeping the circuit from being completed. The switch is said to be caged by the caging device. When the caging device is lowered, the weight is free to simultaneously touch both contacts 6a and 6b, thus completing the circuit. The switch is then said to be in the uncaged state or it has been decaged.

To accomplish the caging, the caging device is permanently attached to and moved by the caging rod 9 that slidably extends through an opening in the wall of the body 1 so the caging device can be manually moved to the caged position for storage during periods of non-use. The distal extremity of the caging rod 9 carries means for attaching the fish line 11. The attachment may be fixed, adjustable, or slidable on the fish line. A slidable attachment would allow the float to slide along the length of the fish line 11 until it engages a stop means adjustably attached to the line at a location commensurate with the desired depth for positioning the hook and lure or bait. Such attachment means are known in the art.

Said opening in the wall of the body 1 for passage of the caging rod 9 is sealed against water penetration by means of a non-hardening sealant compound 10. The caging rod 9 slides relatively freely in an axial direction in the sealant 10, which is preferably cured before the insertion of the rod 9. The sealant successfully used in experimental floats has been "G-E Stock Number GE 281 'Silicone II' Bathroom Tub and Tile Sealant-white". Other sealants may be suitable.

A unique feature of the caging system is that the switch is automatically decaged when the float is subjected to the forces caused by the acceleration of the float incident to the first casting of the float onto the water by the user. Because the caging mechanism is the connection between the fish line 11 and the float 1, when the combined weight of a fishing lure and the float is cast onto the water by the fisherman using a casting rod, the acceleration to which the float is subjected causes a tensile force on the caging rod 91; this force causes the rod to slide axially in the sealant 10 in a direction away from the switch 4, thereby pulling the attached caging device 8 to the uncaged position.

While applicant has conceived of and built one cageable switch and caging device that will automatically decage for use in a fishing float, he appreciates that many other means may be used to accomplish the same end. Considering the state of microelectronics today and the low costs of such devices that are becoming commonplace items of commerce, applicant believes little effort would be necessary to design and build a microelectronic circuit that would include a small accelerometer of appropriate size to act as an electronic decaging device when the float is subjected to an acceleration above a preset level and which circuit could also include a timing portion that would electronically cage the device when it has been totally or relatively motionless for a preset period of time. It is applicant's intent to include in his invention such electronic caging or other caging that is automatically reset to an uncaged state when subjected to the accceleration incident to the casting of the lure and the float onto the water.

Returning to the specific example, an internal brace 7 serves as a guide for the caging device to keep it aligned with the switch. Such a brace is seen in FIG. 2 and in FIG. 4. Other means may be employed to serve this purpose.

Figure 5:
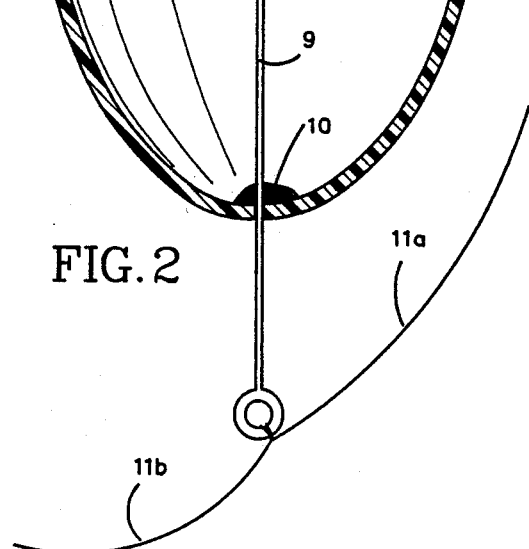
FIG. 5 shows a detail of the position sensitive switch and the caging device in a mode wherein the conductive weight in the switch is spherical.

In this example the switch comprises a rod-like weight the length of which is typically more than twice its diameter and one end of which is tapered to form a non-locking taper to simultaneously engage both of two slightly separated contacts, thereby to complete the electrical circuit. A non-locking taper is a taper wherein the apex angle is greater than approximately 14 degrees. The tapered tip may be blunted to eliminate sharp edges or points that might affect plating the weight where plating is desired. When the float is tippd as by the tug of a fish on portion 11b of the fish line, the float tips and the weight falls to bridge the gap between the contacts 6a and 6b, causing current to flow through the circuit to light the lamp. In the best mode, a conductive ball used as the conductive weight 5b, as is shown in FIG. 5. When the weight is spherical, the caging device works in the same manner as is described above; closer tolerances must be maintained, however, and a convex caging device may be a necessity. The advantage gained by using a spherical weight is one of increased sensitivity.

In the best mode, the switch contacts 6a and 6b and the weight 5 are rhodium plated to provide wear resistance and to improve electrical contact by providing a surface not subject to tarnishing or oxidation. The base metal used for the weight is copper or brass. A plastic weight could be used by first making the surface conductive, as by coating it with graphite or by using chemical vapor deposition to form a metal film thereon, and then electroplating with the desired noble metal.

Although rhodium has been the metal of choice for experiments, applicant anticipates the suitability of other noble metals generally classified under the commercial term "platinum", often applied to platinum and palladium metals including ruthenium, rhodium, palladium, osmium, iridium, and platinum. gold plating would also be appropriate, as might be a silver-nickel alloy coating. Suffice it to say that, although the parts are sealed in a water-tight body, moisture cannot be totally excluded, nor can air or gasseous air contaminants, so logic demands attention be paid to making good electrical contacts that can function reliably without cleaning or other servicing, if a high quality product is desired.

In the figures, it can be seen that the float as a whole and its inner parts are substantially symmetrical about the longitudinal axis of the body 1. Although this symmetry is not essential to the invention, it does represent the best mode. In the best mode, applicant desires his position sensitive switch to be totally functional regardless of the orientation at which the float rests in the water. That is, the float may rotate about its longest axis and the switch will be fully functional all the while.

Having thus described his invention, including a totally functional specific example thereof, applicant desires to include within the scope of his invention those improvements that would be immediately obvious to one skilled in the art, some, but not all of which have been referred to herein. Applicant desires the breadth of his invention to be limited only by the scope of the claims appended hereto.

I claim:

1. In a fishing float of the type that includes, for the purpose of signaling a tug on the fish line, an electrical circuit comprising in series connection a battery power source, a lamp, and a position sensitive switch, which circuit is contained in a body of sufficient buoyancy to float on the surface of water, the improvement being that said position sensitive switch comprises:
   a. a first electrical contact;
   b. a second electrical contact;
   c. a weight chamber partially closed at one end thereof by said first and second electrical contacts in a spaced apart relationship to one another; and
   d. an electrically conductive weight slidably contained within said weight chamber and of a size and shape capable of bridging the space between said first and second contacts simultaneously touching both contacts, thereby completing an electrical circuit comprising said contacts, which weight may move within said chamber under the influence of gravity to touch or not touch said contacts;
   wherein the movement of said conductive weight may be restricted from contacting at least one of said contacts by means of a movable nonconductive body whose position is manually adjusted relative to said first and second electrical contacts to selectively place the circuit into an inactive first state wherein said conductive weight is so restricted from an active second state wherein said conductive weight is not so restricted.

2. The fishing float of claim 1 wherein said movable nonconductive body may be manually adjusted to selectively place the circuit into said active second state from said inactive first state.

3. The fishing float of claim 1 wherein said movable nonconductive body is automatically moved to rest the circuit to said active second state when said float is subjected to the forces caused by the acceleration of the float incident to the first casting of the float onto the water by the user when said circuit is initially in said inactive first state.

4. The fishing float of claim 1 wherein said conductive movable weight has been coated with a thin layer of a platinum metal such as ruthenium, rhodium, palladium, osmium, iridium, or platinum, or mixtures thereof, for examples, all of which metals and mixtures are included in the commercial term "platinum".

5. The fishing float of claim 4 wherein said platinum metal is rhodium.

6. The fishing float of claim 1 wherein said contacts are coated with a thin layer of a platinum metal such as ruthenium, rhodium, palladium, osmium, iridium, or platinum, or mixtures thereof, for examples, all of which metals and mixtures are included in the commercial term "platinum".

7. The fishing float of claim 6 wherein said platinum metal is rhodium.

8. The fishing float of claim 1 wherein said conductive weight has been coated with a thin layer of a non-oxidizing metal such as gold, silver, or mixtures of silver with nickel, for examples.

9. The fishing float of claim 1 wherein said contacts are coated with a thin layer of a non-oxidizing metal such as gold, silver, or mixtures of silver with nickel, for examples.

10. The fishing float of claim 1 wherein said weight is spherical.

11. The fishing float of claim 1 wherein the mass of said weight comprises copper.

12. The fishing float of claim 1 wherein said weight is a rod having a length-to-diameter ratio of greater than approximately 2.

13. The fishing float of claim 12 wherein said rod is tapered on at least one end with a non-locking taper.

14. The fishing float of claim 12 wherein said rod is tapered on at least one end, which tapered end has an apex angle of greater than 14 degrees, though the apex may be blunted.

15. The fishing float of claim 1 wherein all components are mounted substantially symmetrically around a major axis of said float thereby providing switch action that is totally independent of rotation about said axis.

16. In a fishing float of the type that includes, for the purpose of signaling a tug on the fish line, an electrical circuit comprising in series connection a battery power source, a lamp, and a position sensitive switch, which circuit is contained in a body of sufficient buoyancy to float on the surface of water, the improvement being that said position sensitive switch comprises:

a. a first electrical contact;
b. a second electrical contact;
c. a weight chamber partially closed at one end thereof by said first and second electrical contacts in a spaced apart relationship to one another; and
d. an electrically conductive weight slidably contained within said weight chamber and of a size and shape capable of bridging the space between said first and second contacts simultaneously touching both contacts, thereby completing an electrical circuit comprising said contacts, which weight may move within said chamber under the influence of gravity to touch or not touch said contacts;

wherein said weight is a rod having a length-to-diameter ratio of greater than approximately 2, and wherein said rod is tapered on at least one end with a non-locking taper.

17. The fishing float of claim 16 wherein said tapered end has an apex angle of greater than 14 degrees, though the apex may be blunted.

* * * * *